United States Patent
Toda (10) Patent No.: US 6,528,810 B1
(45) Date of Patent: Mar. 4, 2003

(54) IMAGE READING APPARATUS

(75) Inventor: Haruyuki Toda, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/280,204

(22) Filed: Mar. 29, 1999

(30) Foreign Application Priority Data

Apr. 2, 1998 (JP) .......................................... 10-089633

(51) Int. Cl.$^7$ .............................................. G03B 42/02
(52) U.S. Cl. ..................................... 250/586; 250/584
(58) Field of Search ................................. 250/586, 584

(56) References Cited

U.S. PATENT DOCUMENTS 5,027,274 A * 6/1991 Takayanagi ................. 250/584
5,610,688 A * 3/1997 Inamoto et al. ............. 399/366

FOREIGN PATENT DOCUMENTS

JP          0119839 A  *  8/1989  ........... G03B/42/02

* cited by examiner

Primary Examiner—Constantine Hannaher
(74) Attorney, Agent, or Firm—Frishauf, Holtz, Goodman & Chick, P.C.

(57) ABSTRACT

In an image reading apparatus provided with a reader for reading a radiation image irradiated onto a radiation image converting medium and for obtaining image information; a first inputting device for inputting a first instruction to inhibit the image information from being outputted to an external apparatus; and a second inputting device for inputting a second instruction to output the image information to the external apparatus; when the first inputting device inputs the first instruction to inhibit, even if the second inputting device inputs the second instruction to output, the image information is not outputted to the external apparatus.

12 Claims, 7 Drawing Sheets

FLOW CHART SHOWING PROCESSING
TO BE DONE AT AN END OF READING

FIG. 4 DIAGRAM SHOWING DISPLAY EXAMPLES ON DISPLAY SECTION OF THE INVENTION

FIG. 5

FLOW CHART SHOWING PROCESSING TO BE DONE AT AN END OF READING

IMAGE READING APPARATUS

BACKGROUND OF THE INVENTION

The present invention relates to an image reading apparatus, and more particularly, to an image reading apparatus using a radiation image converting medium, which is arranged the image data stored with a predetermined designation would not be deleted.

When a certain type of a phosphor is irradiated by radiation rays (X rays, α-rays, β-rays, γ-rays and ultraviolet rays), a part of energy of radiation rays is accumulated in the phosphor. X-rays may include the other type of radiation hereinafter. It is known that when this phosphor is irradiated by excitation light such as a visible light, stimulated emission is observed on the phosphor in responding to the accumulated energy. The phosphor showing such characteristics is called an accumulative phosphor or a stimulative phosphor.

It is possible to temporarily record radiation image information of a human body or the like on the accumulative phosphor provided on a sheet (a radiation image conversion plate such as a stimulative phosphor plate), then to generate stimulated emission light by scanning the radiation image conversion plate with a excitation light such as a laser beam, and then, to obtain image signals by electrically reading the obtained stimulated emission light.

But, the present invention can be adapted to a different kind of radiation image converting medium irradiated by X-ray, per se. For example, X-ray sensing plate made of semiconductor, and hybrid type X-ray sensing plate made of the scintillation layer and optical sensing plate.

As the image reading apparatus stated above, there are two types of the apparatus, one is a film-installing type and the other one is of a cassette type. In both of them, however, after images thus read are determined, the images are outputted immediately, without being protected or stored.

SUMMARY OF THE INVENTION

The invention has been achieved in view of the problem stated above, and its object is to provide an easy-to-operate image reading apparatus.

The object mentioned above can be attained by the following structures.
(A) An image reading apparatus, comprises
reading means for reading a radiation image irradiated onto a radiation image converting medium and for obtaining image information;
first inputting means for inputting a first instruction to inhibit the image information from being outputted to an external apparatus; and
second inputting means for inputting a second instruction to output the image information to the external apparatus;
wherein when the first inputting means inputs the first instruction to inhibit, even if the second inputting means inputs the second instruction to output, the image information is not outputted to the external apparatus.
(B) An image reading apparatus, comprises:
reading means for reading a radiation image irradiated onto a radiation image converting medium and for obtaining image information;
a first memory to store the image information;
third inputting means for inputting a third instruction to inhibit the image information from being eliminated from the first memory; and
second inputting means for inputting a second instruction to output the image information to the external apparatus;
wherein when the third inputting means inputs the third instruction to inhibit, even if the second inputting means inputs the second instruction to output, the image information is not eliminated from the first memory.

Further, the object mentioned above can be attained by the following preferable structures. (Structure 1): With regard to a recording medium on which a radiation image is recorded, there is provided a means in which data corresponding to radiation images to be stored are stored in advance through reservation, then, information showing at least reference retention is added to reserved data, and when reading image data in which these pieces of information are added, these image data are not outputted, or they are not deleted from the storing means even when a button for image output is selected.

The invention makes it possible not to output images with an instruction for image output as a momentum with regard to image data wherein specific information is added to reservation data, and to observe images again in detail later by keeping these image in the storing means, or to make the image data to be in storage until one person finishes reading plural images. (Structure 2): With regard to a recording medium on which a radiation image is recorded, there is provided a means in which data corresponding to radiation images to be stored are stored in advance through reservation, then, information showing at least inspection retention is added to reserved data, and when reading image data in which these pieces of information are added, these image data are not outputted, or they are not deleted from the storing means even when a button for image output is selected.

The invention makes it possible not to output images with an instruction for image output as a momentum with regard to image data wherein specific information is added to reservation data, and to observe images again in detail later by keeping these image in the storing means, or to make the image data to be in storage until one person finishes reading plural images. In the case of inspection retention, it is also easy to control, because plural images of one patient are outputted collectively.

BRIEF DESCRIPTION OF THE DRAWINGS

FIGS. 1(*a*) and 1(*b*) are diagrams showing an example of the structure of a cassette used in the invention.

DETAILED DESCRIPTION OF THE PREFERRED EMBODIMENT

An embodiment of the invention will be explained in detail as follows, referring to the attached drawings.

Figure 1A:
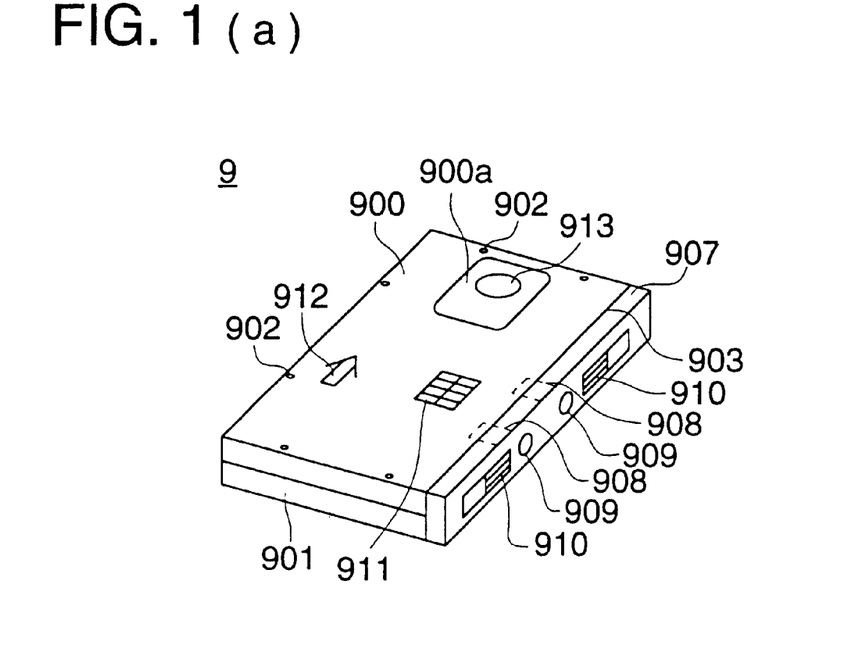
Figure 1B:
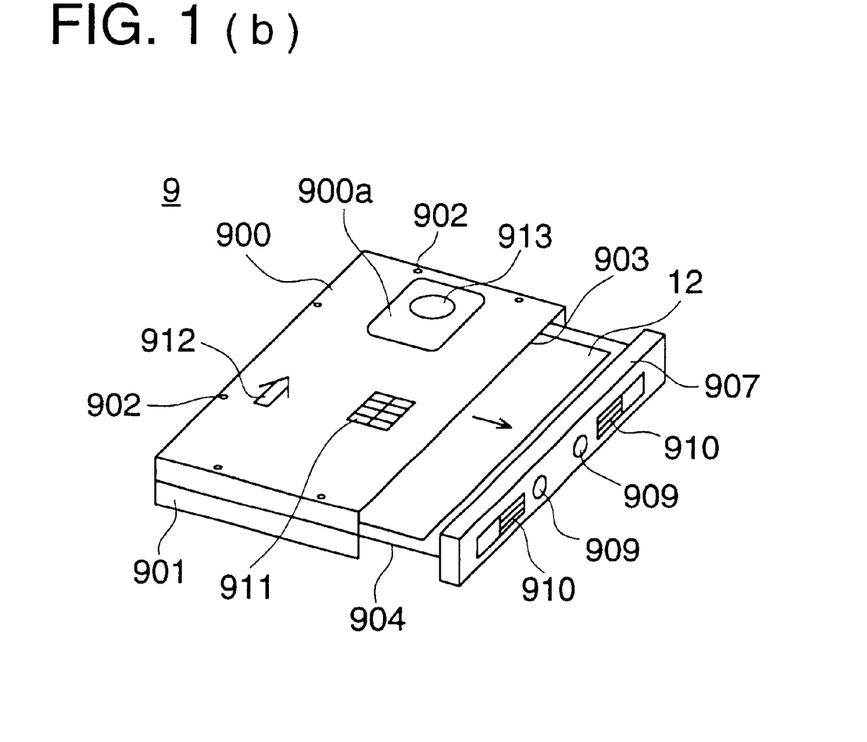

FIGS. 1(a) and 1(b) are diagrams showing examples of structure of a cassette used in the invention. Cassette 9 is composed of case half 900 being the back half of the cassette and case half 901 being the front (the surface to be irradiated by X-rays) both of which are made to be opposite to each other and are bound on their peripheries with screws 902 to be integrally joined.

On one side of cassette 9, there is formed opening 903 through which radiation image conversion plate 12 can be drawn out when cap 907 is pulled. The radiation image conversion plate 12 has therein a stimulative phosphor layer which stores energy in accordance with the distribution of radiation transmissivity of the object for an amount of radiation emitted from the radiation generating source, and it forms a latent image. In the radiation image conversion plate 12, there is provided a stimulative phosphor layer through vapor phase deposition or coating. The stimulative phosphor layer is shielded or covered by a protecting member to be protected from adverse effects of its surroundings and from physical damage.

The radiation image conversion plate 12 is fixed on rigid tray 904 inside cassette 9, and paired engagement pins (not shown) are provided at the portion other than the area where images are re corded on tray 904, and these paired engagement pins pass through the tray 904 of the radiation image conversion plate 12.

Cap 907 houses locking mechanism 908, and the locking mechanism 908 can be unlocked through locking hole 909. Further, a pair of levers 910 are provided on the cap 907, and the cap 907 is opened and closed by the paired levers 910 so that the radiation image conversion plate 12 can be drawn out and inserted in the cassette 9 together with the tray 904.

On the back side of cassette 9, there is pasted discrimination seal 911, on which discrimination information composed of white color and black color is recorded, and the types and sizes of the cassette 9 are detected through detection of the discrimination information of the discrimination seal 911. The discrimination seal 911 is also used for distinction of the inserting direction as well as the obverse and reverse surfaces of the cassette 9.

Though instruction for the vertical directions of grids on the cassette 9 depends on instruction mark 912 in the vertical direction, it is also possible to designate the vertical direction by inserting the cassette 9 in a cassette stacker section, with cap 907 facing downward.

Further, on the back side of the cassette 9, there is provided diagnosis and treatment record clip 913, on case half 900, and recessed portion 900a is formed around the diagnosis and treatment record clip 913 on case half 900, thus, a diagnosis and treatment record is held between the recessed portion 900a and the diagnosis and treatment record clip 913.

Figure 2:
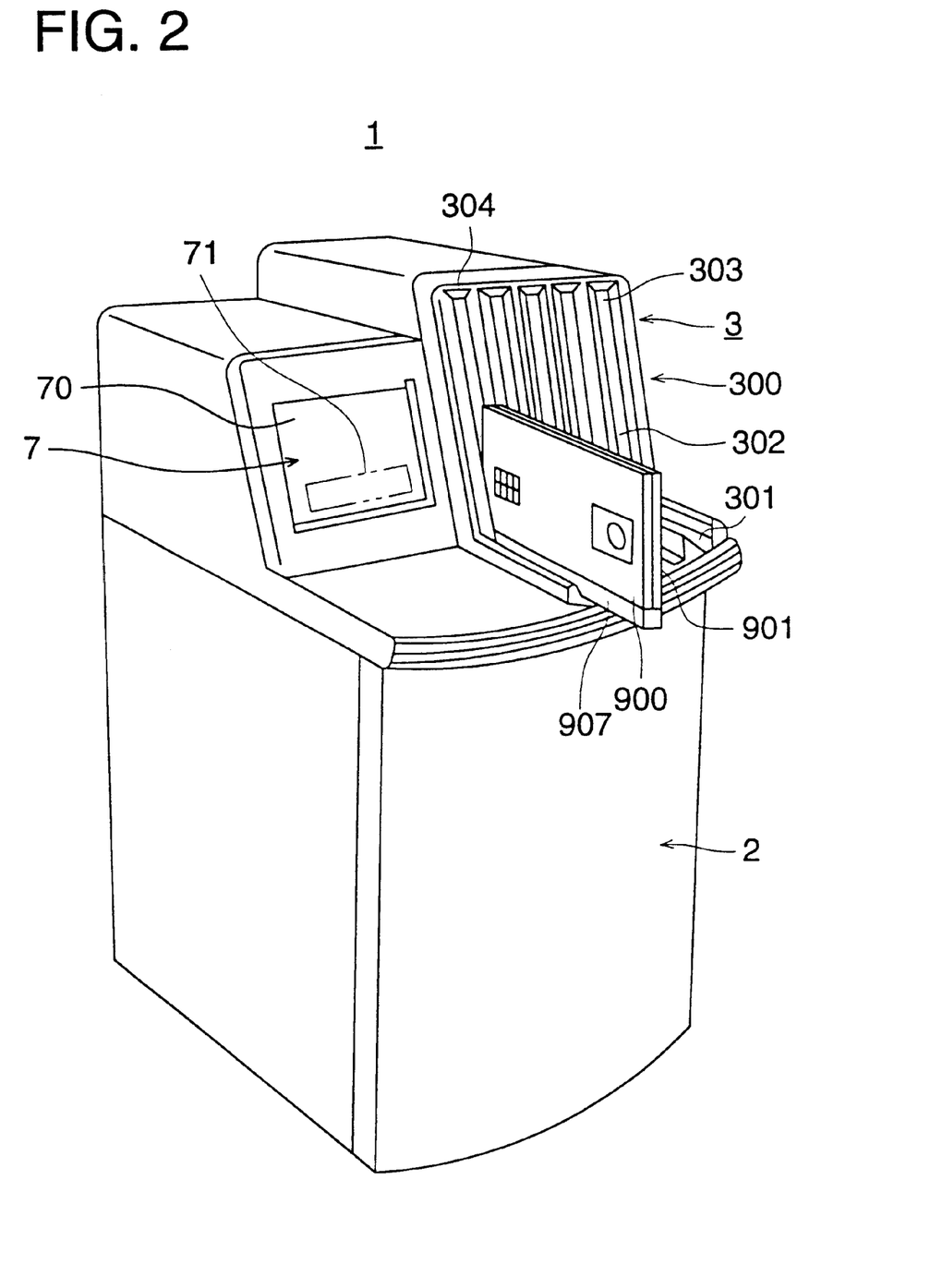
FIG. 2 is a diagram showing an example of the appearance and structure of an image reading apparatus.

FIG. 2 is a diagram showing an example of the external structure of image reading apparatus 1 of the invention. Cassette stacker section 3 and display/operation section 7 are arranged side by side on an upper portion of radiation image reading apparatus 1 to be almost in a horizontal direction. Namely, the cassette stacker section 3 is arranged at the right side on the diagram on the upper portion of the radiation image reading apparatus 1, while, the display/operation section 7 is arranged at the left side on the diagram on the upper portion of the radiation image reading apparatus 1.

The cassette stacker section 3 has insertion section 300 provided for each of 5 slots. On the display/operation section 7, there are provided CRT display section 70, serving as a display section, and touch panel 71 serving as an operation section provided on the display surface of the CRT display section 70, and on the CRT display section 70, there are conducted operations such as inspection reservation and patient registration, the state of display and setting for various sections of the apparatus as well as display of images obtained through reading.

For the CRT display section 70, there is used a 15 inch CRT display unit (24-bit color, monochromatic, 256 gradations and resolution 1024 ×768), for example, and input for an operation is conducted on touch panel 71 on the CRT display section 70.

Touch panel 71 in the present embodiment is made to be of an optical system wherein a response is made by interception of light, for example, of infrared rays. Insertion section 300 is composed of insertion guide section 301 and holding section 302. The insertion guide section 301 is a groove-shaped one which is extended to the holding section 302, and it is formed so that it may guide the cassette 9 to the holding section 302 while ensuring that cassette 9 is kept vertical. Cassette 9 is held in the holding section 302 with a prescribed clearance.

Cassette 9 is to be inserted longitudinally with its longer side kept horizontal, with this side of the apparatus serving as a reference, and simultaneously with insertion of the cassette 9, light-shielding shutter 303 provided on the opening of the holding section 302 is closed for each slot to prevent light from leaking through the opening section.

Cassette 9 can be drawn out of each slot, and LED lamp 304 showing "under reading" is provided to prevent that the cassette 9 is drawn out by mistake. Incidentally, a size of a cassette is not necessarily fixed, but can vary widely.

Figure 3:
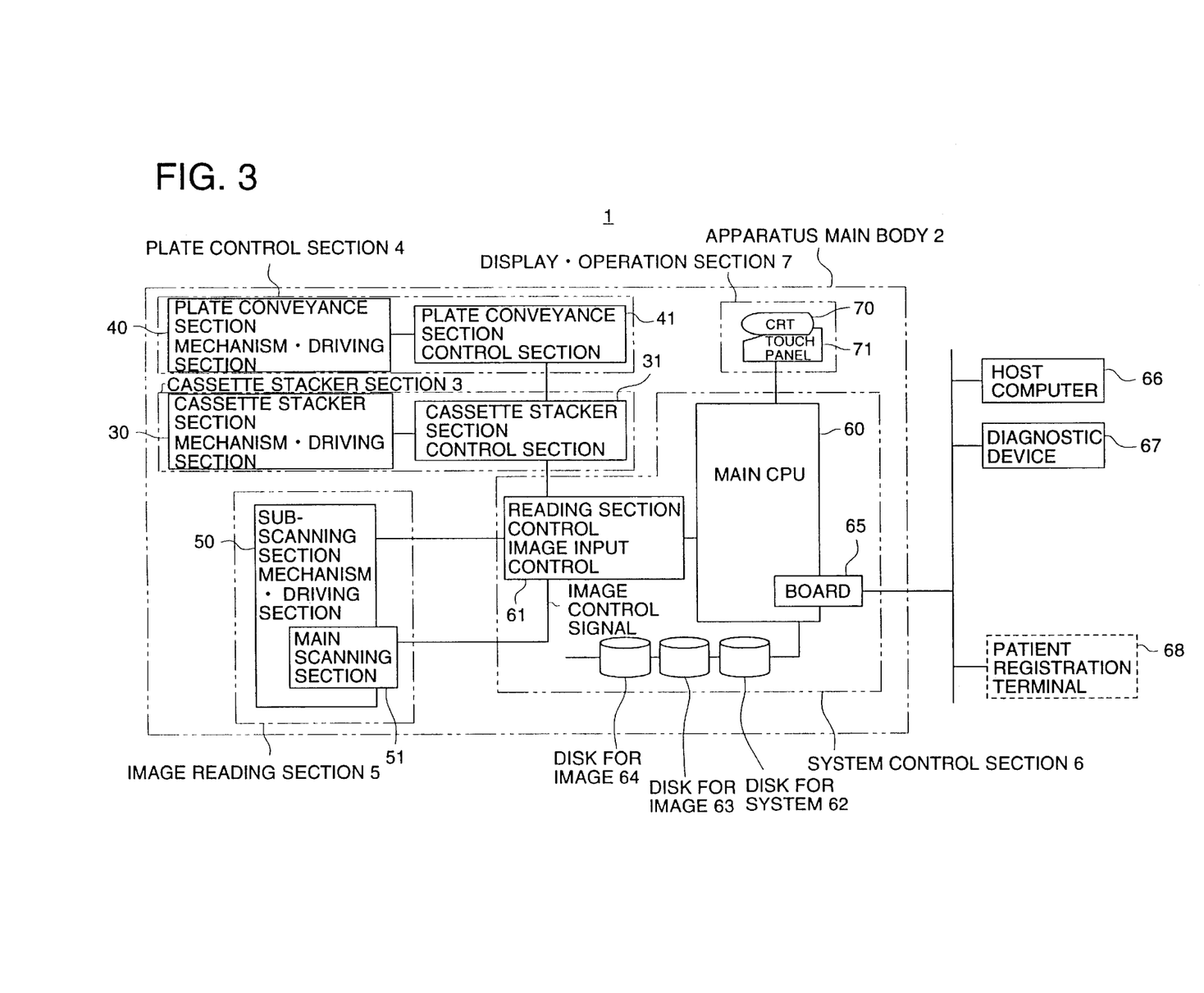
FIG. 3 is a block diagram showing an embodiment of the invention.

FIG. 3 is a block diagram showing an embodiment of a radiation image reading apparatus in the invention. On cassette stacker section 3 provided on apparatus main body 2 of the radiation image reading apparatus 1, there are provided cassette stacker section mechanism/driving section 30 and cassette stacker section control section 31 so that cassette 9 housing therein plural types of radiation image conversion plates may be set. When the cassette stacker section mechanism/driving section 30 is driven based on the control of the cassette stacker section control section 31, and the cassette 9 holding therein radiation image conversion plates is inserted, setting is made to the prescribed state.

On plate control section 4, there are provided plate conveyance section mechanism/driving section 40 and plate conveyance section control section 41, and the plate conveyance section control section 41 controls the plate conveyance section mechanism/driving section 40 based on a command coming from the cassette stacker section control section 31. The plate conveyance section mechanism/driving section 40 pulls radiation image conversion plate 12 out of cassette 9, and conveys the radiation image conversion plate 12 thus pulled out toward the image reading section.

Image reading section 5 is provided with sub-scanning section mechanism/driving section 50 and main scanning section 51, so that the main scanning section 51 is conveyed in the sub-scanning direction by the sub-scanning section mechanism/driving section 50, whereby image reading by means of laser scanning by the main scanning section 51 is conducted.

System control section 6 is equipped with main CPU 60 and reading section control image input control section 61. The main CPU 60 is connected to disk for system 62 storing therein a system program and to disks for image 63 and 64 storing therein image information, and it is further connected, through board 65, to host computer 66, diagnostic device 67 and patient registration terminal 68. In the main CPU 60, overall control, image processing, output control and image control are conducted. The reading section control image input control section 61 controls cassette stacker section control section 31, sub-scanning section mechanism/driving section 50 and main scanning section 51, and thereby reads images on radiation image conversion plate 12 and sends the image information thus obtained to the main CPU 60.

Display/operation section 7 is equipped with CRT display section 70 serving as a display section to display images obtained by image reading section 5 through its reading, and is further equipped with touch panel 71 serving as an operation section provided on the display screen of the CRT display section 70, and command information from the touch panel 71 is sent to the main CPU 60 which controls based on the inputted command.

Figure 4:
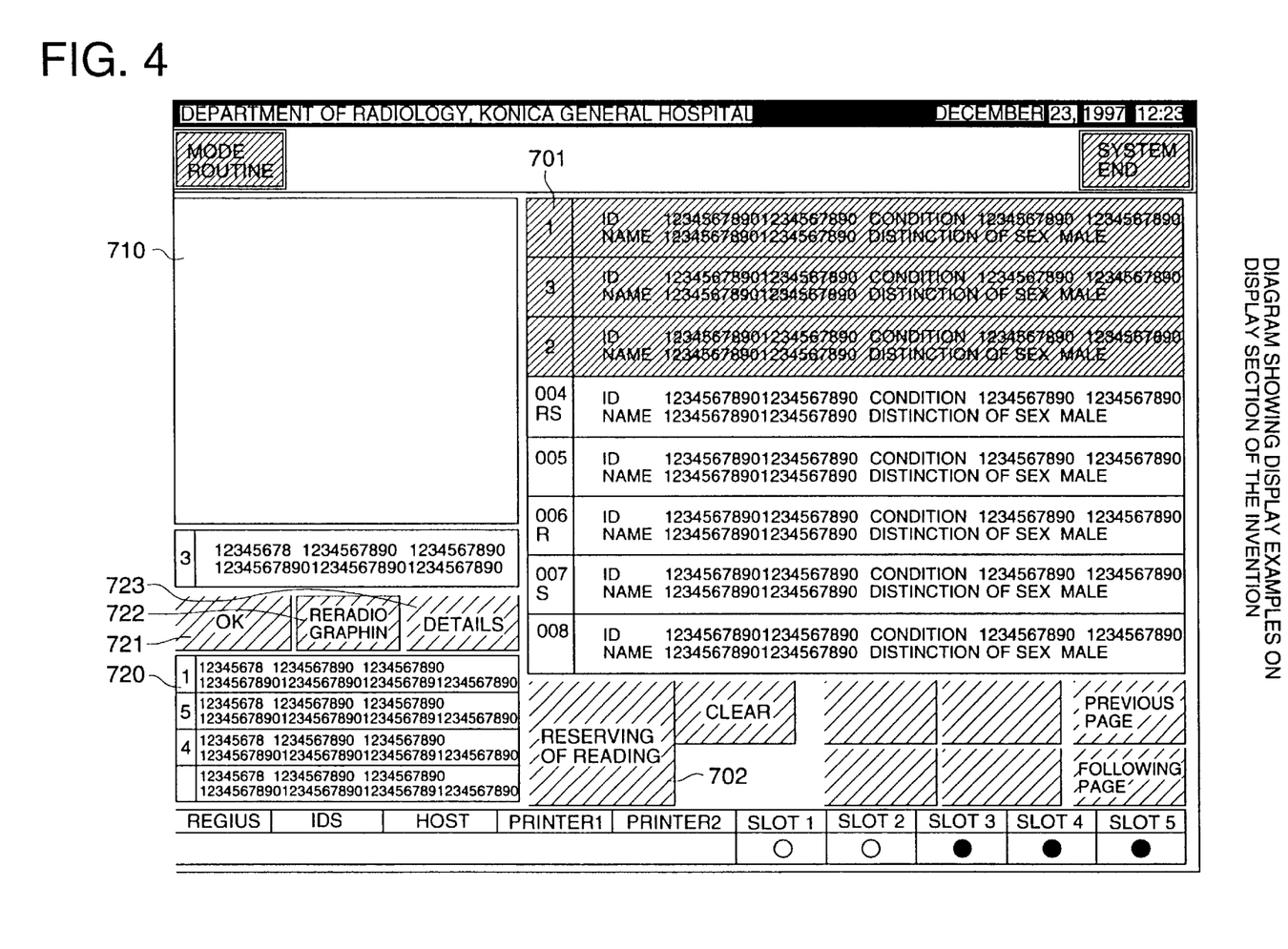
FIG. 4 is a diagram showing an example of display by the display section in the invention.

Next, detailed operations in the invention will be explained. FIG. 4 is a diagram showing an example of a display on a display section in display/operation section 7. In the diagram, the numeral 700 represents a reservation information list, 710 represents an image display section, and 720 represents a reading registration list. The reading registration in this case means that an order for registration and an order for display are made to correspond to each other. On the reservation information list 700, a list of data to be read hereafter is displayed. Then, information scheduled to be subjected to image reading is stored in a memory means. The reservation information list 700 is composed of touch panel 71 (see FIG. 2). Figures in the diagram represent the number of Eusable letters.

First of all, plural types of cassettes 9 are loaded in cassette stacker section 3. In this case, the number of the slot where the cassette is loaded is kept by the main CPU 60 in memory. Therefore, an operator loads cassette 9 wherein images are stored in arbitrary slot of cassette stacker section 3. In this case, the size and type of loaded cassettes are read by CPU 60 from discrimination seal 911 (see FIG. 1) formed on the surface of the cassette.

Therefore, when an operator loads cassettes 9 in arbitrary slots in succession, CPU 60 reads information showing which slot is loaded with cassette 9, information showing the order of loading and the size of the loaded cassette 9. Information thus obtained through reading is stored in a queue (not shown) of the order of cassette insertion.

Then, CPU 60 enters operations to select the type of reservation. First, an operator touches a prescribed data area from the reservation information list 700 to select the type of reservation. In this case, the numeral "1" showing the first touch is displayed on number display area 701, which corresponds to the portion of the name touched first.

Next, when the operator touches name data after skipping one, the numeral "2" showing the second touch is displayed on number display section 701, and so forth. Incidentally, "R" displayed on number display area 701 represents reference retention, and "S" represents inspection retention. Generally, when OK button 721 for allowing the image read to be transmitted (outputted) to the outside of apparatus main body 2 is touched, the image never fails to be stored in a storing means of the apparatus main body 2 such as disk for image 63 or 64, and is outputted (transmitted) to an equipment outside the apparatus main body 2. But when "R" or "S" is attached, if the OK button is pressed, the image is stored in a storing means of the apparatus main body 2 such as disk for image 63 or 64, but it is not outputted (transmitted) to an equipment outside the apparatus main body 2. Further, the image data stored in a storing means of the apparatus main body 2 are usually deleted in procedures explained later, but when "R" or "S" is attached, the image data are not deleted until the reference retention and the inspection retention are canceled and remain in the storing means of the apparatus main body 2, as described later.

The retention in this case is to reserve that an image is outputted to the outside of the apparatus main body 2 representing a reading equipment after the image is read. As a result, in the retention mode, the image is not outputted and stored as pending data in an internal memory. The retention includes, for example, reference retention and inspection retention.

The reference retention means an occasion wherein an image is displayed by a radiologist later. This includes an occasion wherein an image is displayed once, and then, the image further needs to be displayed again, and an occasion wherein an image needs to be displayed when reference retention is canceled, without being displayed at the ordinary point of time for image display (for example, S2 in FIG. 5).

The inspection retention can be utilized when plural sheets of images such as plural sheets of images of the same patient need to be outputted collectively to the outside of a reading equipment. For example, in the case of three sheets of images of the same patient, the first and second sheets of images are subjected to inspection retention, then the inspection retention is canceled after the third sheet of image has been read, and the images are outputted to the outside of a reading equipment.

Next, CPU 60 acquires information selected in terms of reservation type. After this, it registers it in a reservation selection queue (not shown) which is composed of an order of selection and reservation information. The reservation selection queue is stored in disk for image 63 or 64, for example.

When an operator touches reading reservation button 702, reading registration operations are started. CPU 60 checks the queue for the order of cassette insertion. In the queue for an order of cassette insertion, there are stored slot numbers and cassette sizes in the order of insertion. When the queue for an order of cassette insertion is present, CPU 60 checks the reservation selection queue.

When data exist in the reservation selection queue, CPU 60 makes No. 1 of insertion and No. 1 of selection to correspond to each other. Then, CPU 60 registers the correspondence in a reading registration queue in which slot numbers, cassette sizes and reservation information are stored. According to the reading registration queue, the cassette registered first and foremost is the one which is loaded in the slot No. 4, the size of the cassette is 345 ×430 mm, and reservation information is B.

When registration in the reading registration queue is completed, then, information concerned is eliminated from the queue of the order of cassette insertion, and then, information concerned is eliminated from the reservation selection queue. After that, the sequence returns to the origin to repeat the cited operations.

As a result, name data specified by operations conducted up to that point of time are finally determined, and these data are moved to reading registration list 720. Then, display is carried out on display section 710, beginning with an image of the name registered first and foremost. Namely, CPU 60 conducts image reading, beginning with cassette 9 in the order of registration in cassettes 9 loaded in cassette stacker section 3.

Then, images of persons whose names are specified on display section 710 in the order of registration are read and displayed. Radiation images are read by apparatus main body 2 (see FIG. 2), and are displayed on display section 710. Namely, images are displayed in the order of registration. After completion of image observation, an operator touches OK button 721. Then, the displayed image is finally verified, and thereby, it becomes possible to conduct processing to output the image data concerned to the outside of a reading equipment or to store them in a memory means of the reading equipment.

In the present embodiment, an arrangement is made for image data wherein specific information is attached in reservation data, so that images are not outputted to the outside of a reading equipment even when an operator touches OK button 721, and these image data are not deleted from the memory means of the reading equipment. Due to this, it is possible to observe images in detail again later, or to store image data in a memory means of a reading equipment until one person finishes reading plural images. In addition, in the case of inspection retention, plural images of one patient are outputted collectively, which makes it easy to control. Further, in the case of reference retention, it is possible to output only images suitable for diagnosis to a doctor who is a diagnostician, because it is possible to reserve that images unsuitable for diagnosis are transmitted (outputted) to the outside of a reading equipment and to transmit (output) images suitable for diagnosis. Therefore, wrong diagnoses can be prevented.

Further, when images are not outputted to the outside of the reading equipment, the images are stored in the storing means of the reading equipment without being deleted.

Figure 5:
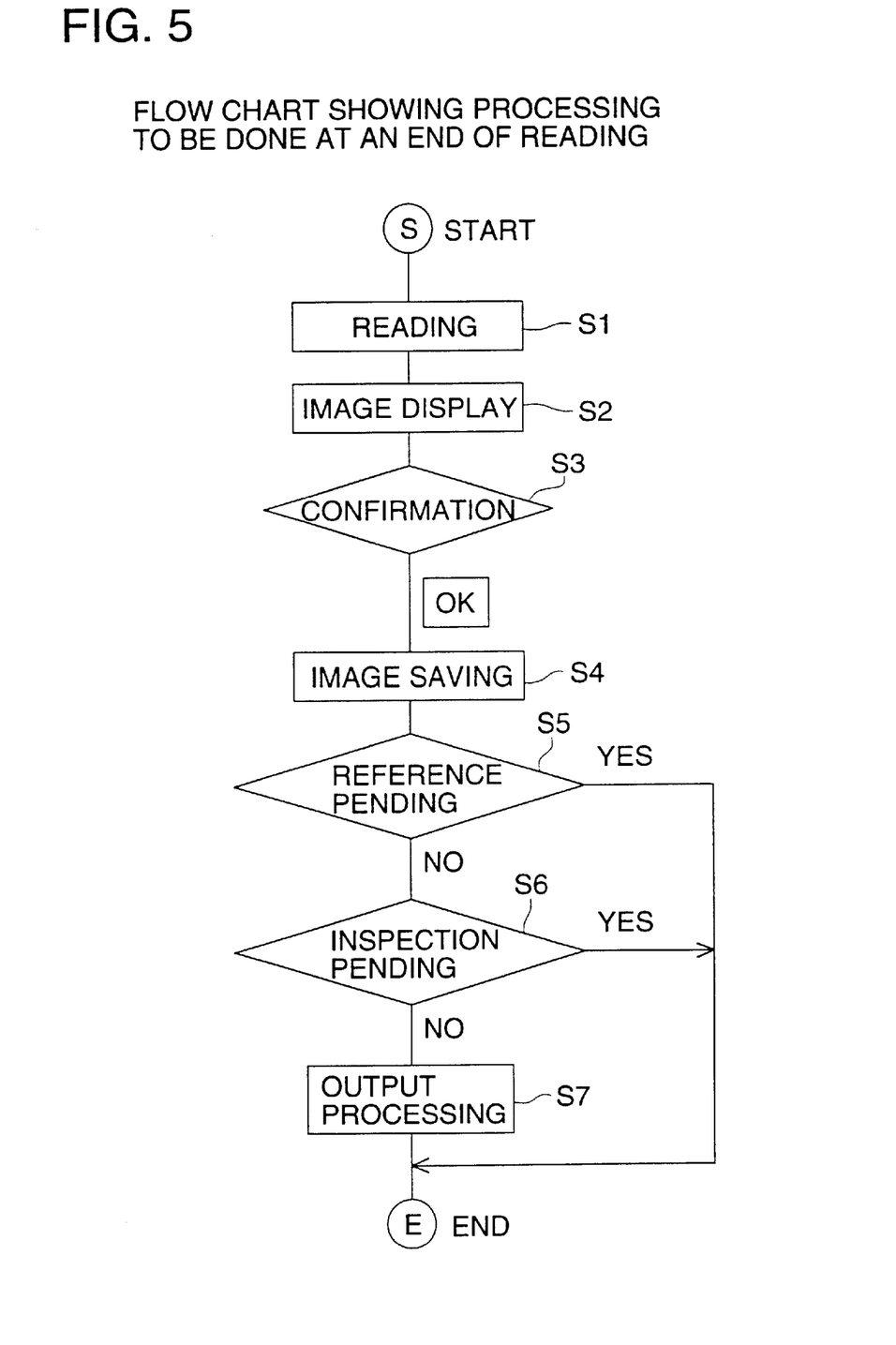
FIG. 5 is a flow chart showing how to process when reading is completed.

FIG. 5 is a flow chart showing processing to be done at an end of reading. First, an image stored in a stimulative phosphor panel is irradiated by a laser beam to cause stimulation emission, and light of this stimulation emission is converted into electric signals to be read (S1). Then, the image thus read is displayed on display section 710 (S2).

An operator observes the displayed image to confirm how the image is displayed (S3). If the image is displayed normally, the operator touches OK button 721. Due to this, the image displayed is stored in disk for image 63 or 64 (S4).

Next, the mode (R, S) for the stored image is checked. If the mode is of reference retention (R), the state of storage is maintained (S5). If the mode is not of the reference retention, the mode is checked whether it is of inspection retention (S) or not (S6). When the mode is of inspection retention, the state of storage is maintained. When the mode is also not of inspection retention, there is conducted output processing to output the stored image (S7).

Figure 6:
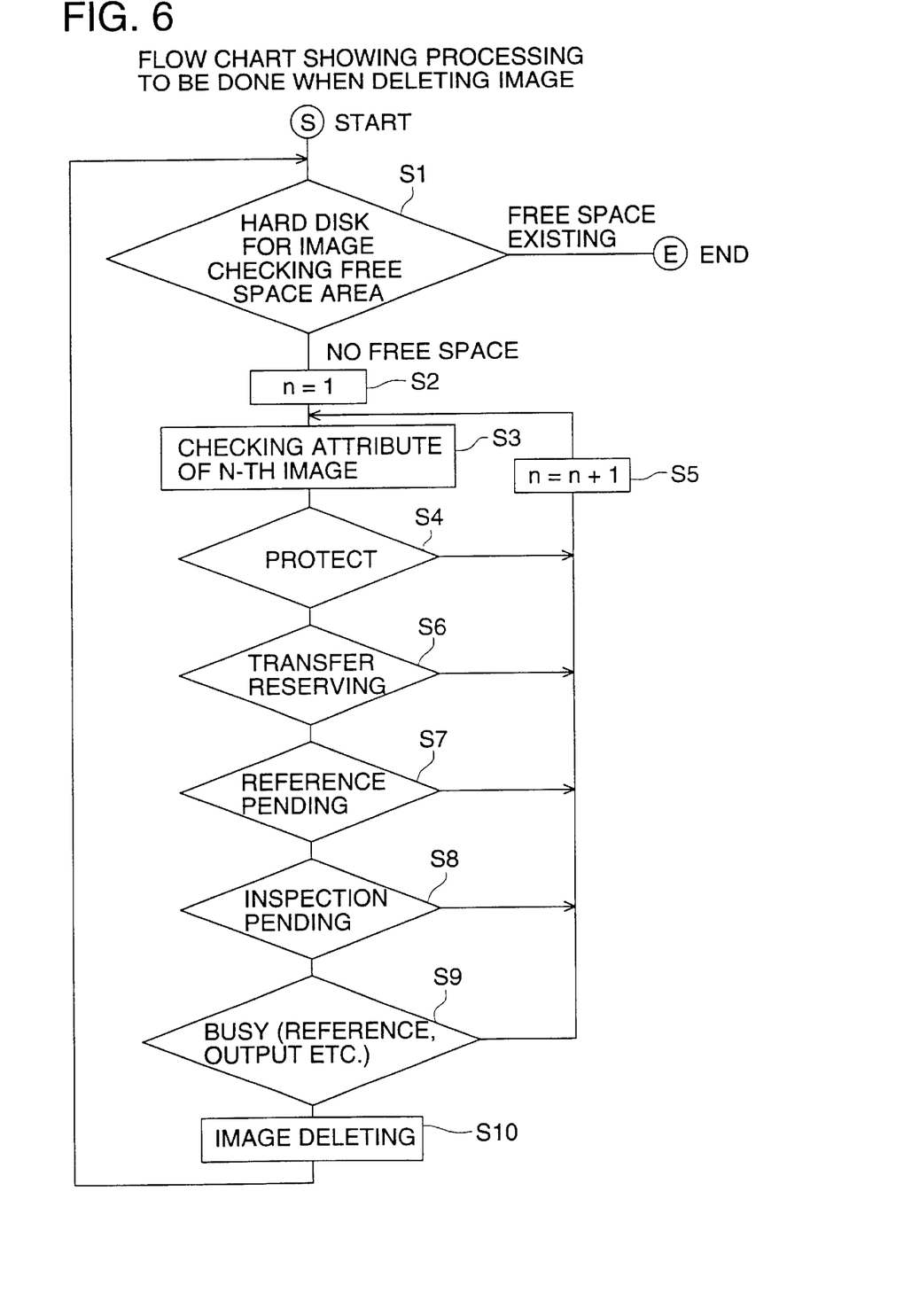
FIG. 6 is a flow chart showing how to process when an image is deleted.

FIG. 6 is a flow chart showing processing to be done when deleting images. CPU 60 checks free space areas in hard disks for image 63 and 64 (S1). If free space areas exist, images are not deleted because they do not need to be deleted.

If the free space area does not exist or is insufficient, setting is made to parameter n=1 (52), and an attribute of the n-th image is checked (S3). When the attribute is of a protect mode, this represents a mode wherein image data should not be deleted in any case. Therefore, it follows that n=n+1 (S5), and the sequence returns to step S3 to check an attribute of the following image. Though the protect mode can be set separately from the setting of reference retention and inspection retention, it is effective that the protect mode is set simultaneously with an occasion of reference retention or inspection retention. For example, it is possible to arrange so that the protect mode is automatically set when a command for reference retention or inspection retention is inputted, and the protect mode is canceled simultaneously with cancellation of reference retention or inspection retention.

If the image attribute is not of a protect mode, it is checked whether it is transfer reservation or not (S6). If it is transfer reservation, images are not deleted, then, n=n+is calculated (S5) and the sequence returns to step S3. The transfer reservation in this case is to make a reservation for image output (transfer) to the outside of a reading equipment. For example, it means the state of registration in outer output queue. To be concrete, when there are three images which are supposed to be outputted to the outside of a reading equipment and have not been outputted, when OK button 721 is pressed, the transfer reservation is made to be conducted fourthly if the OK button 721 is pressed. Then, the image is outputted to the outside of the reading equipment in the order of the transfer reservation. In the present embodiment, when setting is made to reference retention or inspection retention, transfer reservation is not made even when the OK button 721 is pressed. However, it is possible to provide a transfer button separately from an OK button so that transfer may be possible when the transfer button is pressed in an unusual case where an image needs to be outputted to the outside of the reading equipment even in the case of reference retention or inspection retention.

When the image attribute is not transfer reservation, it is checked whether it is reference retention or not (S7). If it is reference reservation, n=n+1 is calculated (S5) and the sequence returns to step S3. When it is not reference reservation, it is checked whether it is inspection retention or not (S8). When it is inspection retention, n=n+1 is calculated (S5) and the sequence returns to step S3.

Next, when the image attribute is also not inspection retention, CPU 60 checks whether the image is busy or not (S9). The expression of "busy" in this case means image reference and output. When the image is busy, n=n+1 is calculated and the sequence returns to step S3. With regard to images which are neither image reference nor output, the images are deleted (10).

In the present embodiment, it is possible to conduct reading for another checkup (another patient) in the course of plural shots of radiographing for the same checkup (one patient), because there is provided a mechanism for inspection retention.

In addition, though an image that is set to reference retention or inspection retention may be stored, keeping its image data size in reading, when it is stored in a memory means of a reading equipment, it is preferable to compress to ⅕–⅘ (for example, ⅘, ⅔, ½, ⅓ and ⅕) of the image data size in reading when storing in the memory means of the reading equipment, or after the prescribed period of time from the storage, because memory capacity can be made small. When compressing, it is preferable that an image is subjected to reversible compression which can restrain erroneous diagnosis, because there is a possibility that the image is used for diagnosis afterwards.

Though reference retention or inspection retention is set on reservation information list 701 in the embodiment stated above, another embodiment wherein reference retention or inspection retention is set when reservation for reading is not set will be explained next. An explanation will be given only to the structures which are different from those in the aforesaid embodiment.

This is especially effective when reference retention or inspection retention needs to be set for a case study, for image confirmation, or for inspection retention, after reading image data, and it is effective for an apparatus wherein reservation of reading can not be made.

In this case, an image is confirmed in S3 after the image obtained through reading in S2 is displayed, and then, reference retention or inspection retention is set without pressing OK button. Or, it is also possible to set reference retention or inspection retention before pressing the OK button.

It is further possible to set reference retention or inspection retention in the course of radiographing.

In the embodiment stated above, there has been explained an image reading apparatus of a cassette type to which the invention is not limited, and the invention can be applied equally to an image reading apparatus of an ordinary type of housing a radiation image conversion plate.

Figure 7:
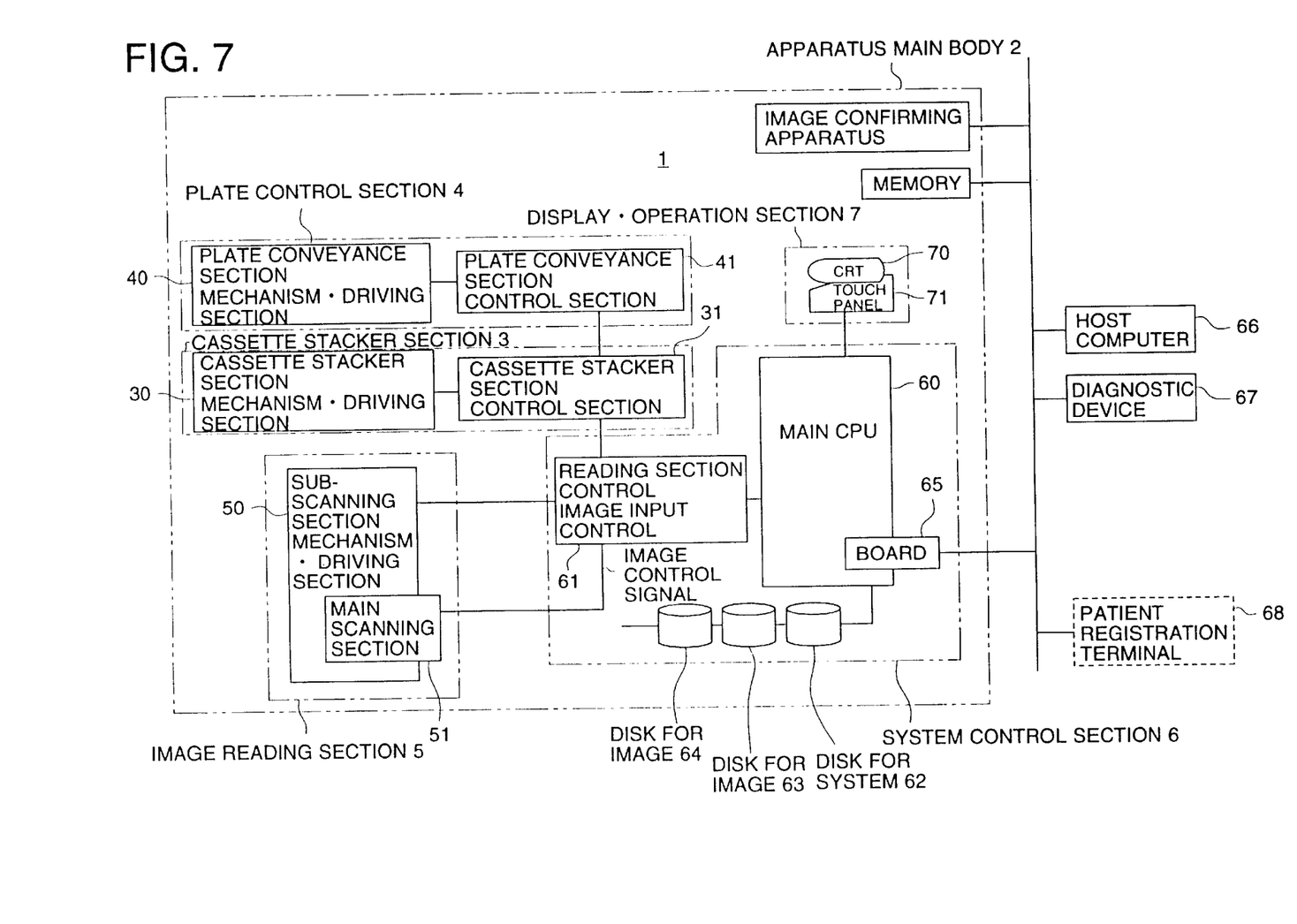
FIG. 7 is a block diagram showing another embodiment of the invention.

FIG. 7 (see the attached sheet) shows another embodiment, and only structures which are different from those in FIG. 3 will be explained.

To the network with which image reading apparatus 1, host computer 66 and diagnosing apparatus 67 are connected, there is equally connected an image confirming apparatus.

In the same way as in the aforesaid embodiment, the image reading apparatus 1 conducts steps in FIGS. 5 and 6 when an OK button is pressed. In this case, image data outputted from the reading apparatus are stored in the memory. Then, radiologist confirms the image data stored in the memory by the use of the image confirming apparatus, and when the image is judged to be suitable for diagnosis, an OK button provided on the image confirming apparatus is pressed. When this OK button is pressed, the image is outputted to the diagnosing apparatus 67 or to the host computer 66. When the image is judged to be unsuitable for diagnosis, the image confirming apparatus requests the image reading apparatus 1 for instruction of another radiographing.

In addition, when the OK button is pressed on the image confirming apparatus, it is preferable that data showing that the image data stored in the memory represent an image suitable for diagnosis are added to the image data stored in the memory.

Next, still another embodiment which is further different will be explained.

In the aforesaid two embodiment, reference retention and inspection retention are set by the image reading apparatus 1. However, it is also possible to conduct the same thing from an inputting means in the image confirming apparatus. In other words, image data obtained through reading by the image reading apparatus 1 are outputted to the memory. Then, display identical to that in FIG. 4 is made on the display means in the image confirming apparatus, and reference retention is set on a touch panel of the display means. As processing to be done when the OK button is pressed on the image confirming apparatus, steps excluding those relating to inspection retention in FIGS. 5 and 6 are conducted on the image confirming apparatus.

Namely, in the aforesaid embodiment, apparatus main body 2 represents image reading apparatus 1, and those other than the image reading apparatus 1 are called an external equipment. In the present embodiment, however, an apparatus main body includes the image reading apparatus 1, the image confirming apparatus and the memory, and those other than the apparatus main body are called an external equipment.

As stated above, it is possible to fix the boundary between an apparatus main body and an external equipment in accordance with a scale of a hospital and a type of a system.

Though an occasion wherein a touch button is used for selection such as reservation data has been taken as an example in the embodiment stated above, the invention is not limited to this, and it is possible to use s selection by means of a key board and clicking by means of a mouse.

Further, though a cassette is used as a mechanism to hold an image storing medium in the invention, the invention is not limited to this, and other holding mechanisms may also be used.

As stated above, the invention makes it possible to provide an image reading apparatus which is easy to operate.

(1) As mentioned above, since the present invention is structured such that, with regard to a recording medium on which a radiation image is recorded, there is provided a means in which data corresponding to radiation images to be stored are stored in advance through reservation, then, information showing at least reference retention is added to reserved data, and when reading image data in which these pieces of information are added, these image data are not outputted, or they are not deleted from the storing means even when a button for image output is selected, the invention makes it possible not to output images with an instruction for image output as a momentum with regard to image data wherein specific information is added to reservation data, and to observe images again in detail later by keeping these image in the storing means, or to make the image data to be in storage until one person finishes reading plural images.

(2) Since the present invention is structured such that, with regard to a recording medium on which a radiation image is recorded, there is provided a means in which data corresponding to radiation images to be stored are stored in advance through reservation, then, information showing at least inspection retention is added to reserved data, and when reading image data in which these pieces of information are added, these image data are not outputted, or they are not deleted from the storing means even when a button for image output is selected, the invention makes it possible not to output images with an instruction for image output as a momentum with regard to image data wherein specific information is added to reservation data, and to observe images again in detail later by keeping these image in the storing means, or to make the image data to be in storage until one person finishes reading plural images. In the case of inspection retention, it is also easy to control, because plural images of one patient are outputted collectively.

What is claimed is:

1. An image reading apparatus, comprising:

reading means for reading a radiation image irradiated onto a radiation image converting medium and for obtaining image information;

first inputting means for inputting a first instruction to inhibit the image information from being outputted to an external apparatus; and second inputting means for inputting a second instruction to output the image information to the external apparatus;

wherein when the first inputting means inputs the first instruction to inhibit, even if the second inputting means inputs the second instruction to output, the image information is not outputted to the external apparatus.

2. The apparatus of claim 1, further comprising:

judging means for judging whether or not the image information is outputted to the external apparatus; and control means for controlling such that when the judging means judges to output, the image information is outputted to the external apparatus.

3. The apparatus of claim 2, wherein when the first inputting means does not input the first instruction to inhibit, the judging means judges to output the image information to the external apparatus.

4. The apparatus of claim 2, further comprising:

a first memory to store the image information; wherein the control means controls the first memory so as to output the image information to the external apparatus.

5. The apparatus of claim 4, further comprising:

protecting means for setting not to delete the image information from the first memory.

6. The apparatus of claim 1, further comprising:

a second memory to store data corresponding to an object of the radiation image information as a reserving data in advance; and correlating means for correlating the first instruction to inhibit inputted by the first inputting means with the reserving data.

7. The apparatus of claim 1, wherein the first instruction for the inhibition is inputted in the case of reference retention or inspection retention.

8. An image reading apparatus, comprising:

reserving means for reserving in advance data corresponding to a radiation image to be stored with regard to a recording medium in which the radiation image is recorded and for memorizing the reserved data;

adding means for adding at least information representing reference retention to the reserved data;

reading means for reading the radiation image in the recording medium and for generating image data;

a memory to store the image data; and control means for controlling such that when the image data corresponding the data added with the information is read, even if a button to output an image is selected, the image data is not outputted or is not deleted from the memory.

9. An image reading apparatus, comprising:

reading means for reading a radiation image irradiated onto a radiation image converting medium and for obtaining image information;

a first memory to store the image information;

third inputting means for inputting a third instruction to inhibit the image information from being eliminated from the first memory; and second inputting means for inputting a second instruction to output the image information to the external apparatus;

wherein when the third inputting means inputs the third instruction to inhibit, even if the second inputting means inputs the second instruction to output, the image information is not eliminated from the first memory.

10. The apparatus of claim 9, further comprising:

judging means for judging whether or not the image information is eliminated from the first memory; and control means for controlling such that when the judging means judges to eliminate, the image information is eliminated from the first memory.

11. The apparatus of claim 9, wherein the third instruction for the inhibition is inputted in the case of reference retention or inspection retention.

12. An image reading apparatus, comprising:

reserving means for reserving in advance data corresponding to a radiation image to be stored with regard to a recording medium in which the radiation image is recorded and for memorizing the reserved data;

adding means for adding at least information representing inspection retention to the reserved data;

reading means for reading the radiation image in the recording medium and for generating image data;

a memory to store the image data; and control means for controlling such that when the image data corresponding the data added with the information is read, even if a button to output an image is selected, the image data is not outputted or is not deleted from the memory.

* * * * *